United States Patent
Holbert et al.

(10) Patent No.: US 9,415,345 B2
(45) Date of Patent: Aug. 16, 2016

(54) HEAT GENERATION SYSTEM FOR DETERMINING A SELECTIVE CATALYTIC REDUCTION DEVICE EFFICIENCY

(71) Applicant: GM GLOBAL TECHNOLOGY OPERATIONS LLC, Detroit, MI (US)

(72) Inventors: Timothy J. Holbert, Clarkston, MI (US); Eric M. Sisco, Clinton Township, MI (US); Janean E. Kowalkowski, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 607 days.

(21) Appl. No.: 13/760,558

(22) Filed: Feb. 6, 2013

(65) Prior Publication Data
US 2014/0219896 A1 Aug. 7, 2014

(51) Int. Cl.
| | | |
|---|---|---|
| *F01N 3/00* | (2006.01) | |
| *B01D 53/94* | (2006.01) | |
| *F01N 3/20* | (2006.01) | |
| *F01N 3/10* | (2006.01) | |
| *F01N 11/00* | (2006.01) | |

(52) U.S. Cl.
CPC ........ *B01D 53/9495* (2013.01); *B01D 53/9409* (2013.01); *F01N 3/106* (2013.01); *F01N 3/208* (2013.01); *F01N 11/00* (2013.01); *B01D 53/9459* (2013.01); *B01D 2251/208* (2013.01); *B01D 2251/2062* (2013.01); *F01N 2550/02* (2013.01); *F01N 2560/026* (2013.01); *F01N 2610/02* (2013.01); *F01N 2610/03* (2013.01); *Y02T 10/24* (2013.01); *Y02T 10/47* (2013.01)

(58) Field of Classification Search
CPC .......................... B01D 53/9495; F01N 3/2006

USPC ............................................ 60/277, 299–311
See application file for complete search history.

(56) References Cited

U.S. PATENT DOCUMENTS

| | | | | |
|---|---|---|---|---|
| 6,068,528 | A  * | 5/2000 | Suzuki .............................. | 440/1 |
| 2003/0070423 | A1* | 4/2003 | Morinaga et al. ............... | 60/284 |
| 2008/0245056 | A1* | 10/2008 | Kawakita et al. ............... | 60/276 |
| 2010/0180576 | A1* | 7/2010 | Wang et al. ...................... | 60/276 |
| 2010/0276223 | A1* | 11/2010 | Gonze ................ | B01D 53/9409 180/309 |
| 2011/0061372 | A1 | 3/2011 | Levijoki et al. | |

FOREIGN PATENT DOCUMENTS

DE           10066237 B4     6/2011

\* cited by examiner

*Primary Examiner* — Audrey K Bradley
*Assistant Examiner* — Anthony Ayala Delgado
(74) *Attorney, Agent, or Firm* — Cantor Colburn LLP

(57) ABSTRACT

A control method and system for monitoring a selective catalytic reduction ("SCR") device of an exhaust gas treatment system is disclosed. The method includes monitoring a plurality of operating conditions related to determining an efficiency of the SCR device and a SCR temperature. The method includes determining if each of the operating conditions are within a respective predetermined range and if the SCR temperature is below an operating temperature range. The method includes activating a hydrocarbon supply based on if each of the operating conditions are within the respective predetermined range and if the SCR temperature is below the operating temperature range. The hydrocarbon supply is located upstream of the SCR device to generate heat if activated. The method includes monitoring the SCR temperature to determine if the SCR device is operating within the operating temperature range.

16 Claims, 2 Drawing Sheets

HEAT GENERATION SYSTEM FOR DETERMINING A SELECTIVE CATALYTIC REDUCTION DEVICE EFFICIENCY

FIELD OF THE INVENTION

Exemplary embodiments of the invention relate to exhaust gas treatment systems for internal combustion engines and, more particularly, to an exhaust gas treatment system for activating a hydrocarbon supply located upstream of a selective catalytic reduction ("SCR") device.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing $NO_x$ emissions is a selective catalytic reduction ("SCR") device. A reductant or diesel exhaust fluid ("DEF") is typically sprayed or injected into hot exhaust gases upstream of the SCR device. The reductant may be an aqueous urea solution that decomposes to ammonia ("$NH_3$") in the hot exhaust gases and is absorbed by the SCR device. An SCR monitoring system may be included for determining an efficiency of the SCR device (i.e., a rate at which an SCR catalyst reduces $NO_x$). In order to determine SCR efficiency robustly, the SCR device needs to first be heated to a threshold temperature (e.g., generally between about 240° C. to about 300° C.). However, an exhaust gas system does not always experience elevated temperatures which heat the SCR device to the threshold temperature depending on the specific driving pattern. Typically, the SCR device may not reach the threshold temperature unless the drive cycle is relatively transient (e.g., stop and go driving), the vehicle is relatively heavily loaded with cargo, or during towing. Accordingly, it is desirable to provide a system that elevates the temperature of the exhaust gas such that the SCR device attains the threshold temperature needed to determine SCR efficiency.

SUMMARY OF THE INVENTION

In one exemplary embodiment of the invention, a control method and system for monitoring a selective catalytic reduction ("SCR") device of an exhaust gas treatment system is disclosed. The method includes monitoring a plurality of operating conditions related to determining an efficiency of the SCR device by an electronic control module. The electronic control module includes operative logic. The method includes determining if the operating conditions are within the predetermined range, and if the SCR temperature is below the operating temperature range, activating a hydrocarbon supply based on if the operating conditions are within the predetermined range and if the SCR temperature is below the operating temperature range. The hydrocarbon supply is located upstream of the SCR device to generate heat if activated. The method includes monitoring the SCR temperature to determine if the SCR device is operating within the operating temperature range after the hydrocarbon supply is activated.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
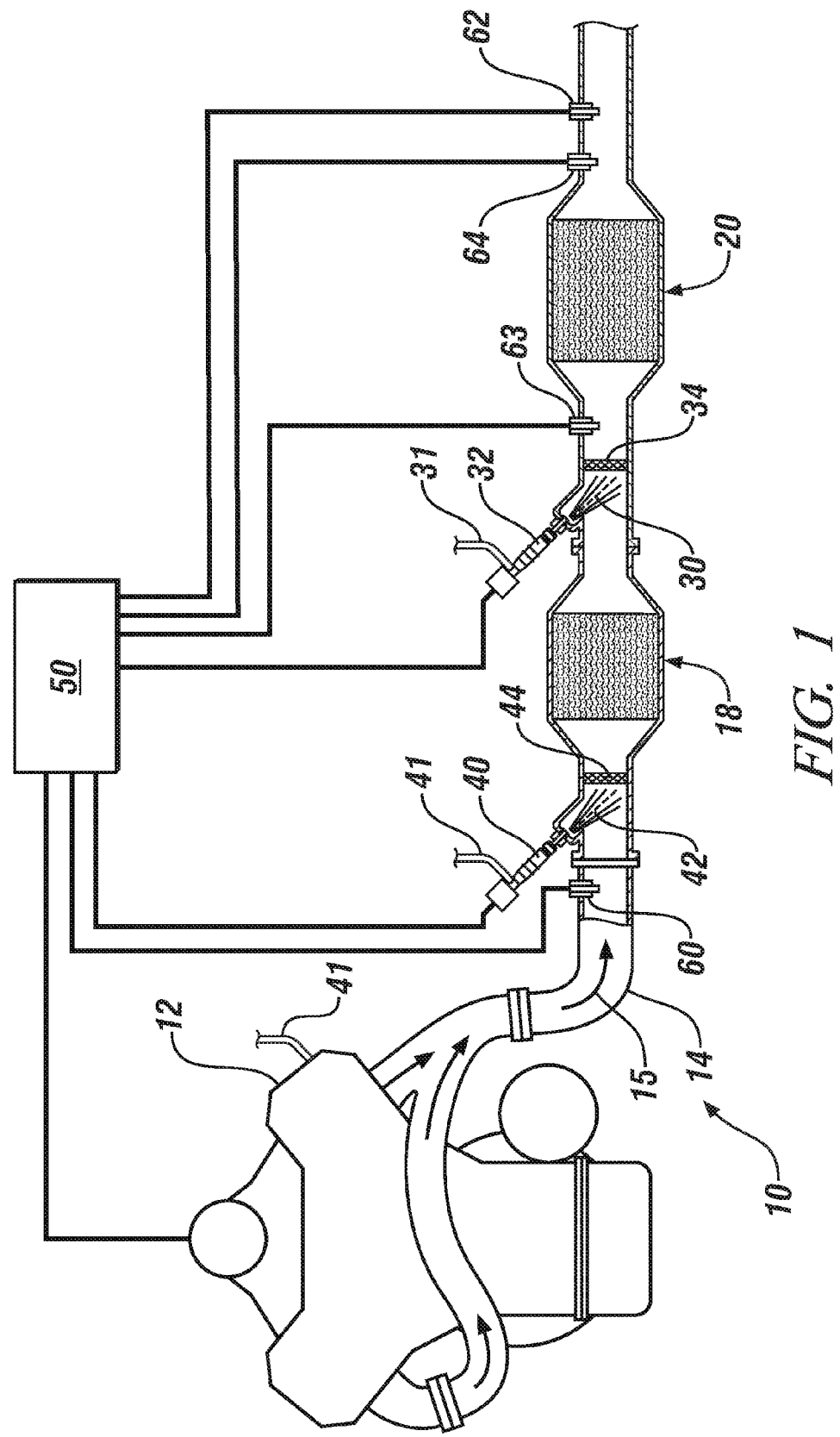
FIG. 1 is a functional block diagram of a vehicle that includes and exhaust treatment system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, or a combinational logic circuit.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems that may include, but are not limited to, diesel engine systems, gasoline engine systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include an oxidation catalyst ("OC") device 18 and a selective catalytic reduction ("SCR") device 20. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The OC device 18 is located upstream of the SCR device 20. The OC device 18 may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCR device 20 may be disposed downstream of the OC device 18. The SCR device 20 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia ("$NH_3$").

A threshold temperature may be associated with the SCR device 20. The threshold temperature is generally above a light-off or minimum operating temperature of the SCR device 20. In order to accurately determine an efficiency of the SCR device 20 for the purposes of diagnosis (which is discussed below), the SCR device 20 needs to be operating within an operating temperature range that is above the threshold temperature. In one embodiment, the operating temperature range may be between about 240° C. to about 300° C., however it is to be understood that other temperature ranges may be used as well. Specifically, if the SCR device 20 is operating within the operating temperature range, this substantially assures that the results of an efficiency calculation of the SCR device 20 is generally accurate.

A reductant or diesel exhaust fluid ("DEF") 30 may be supplied from a DEF supply source 31 and may be injected into the exhaust gas conduit 14 at a location upstream of the SCR device 20 using an injector 32, or other suitable method of delivery of the DEF 30 to the exhaust gas 15. In one embodiment, the DEF 30 reductant may be an aqueous urea solution that decomposes to ammonia ("$NH_3$") in the exhaust gas 15 and is absorbed by the SCR device 20. A mixer or turbulator 34 may also be disposed within the exhaust conduit 14 in close proximity to the injector 32 to further assist in thorough mixing of the DEF 30 with the exhaust gas 15.

A hydrocarbon or fuel injector 40 may be located upstream of the OC 18 in fluid communication with the exhaust gas 15 in the exhaust gas conduit 14. The fuel injector 40 is in fluid communication with a source of hydrocarbon 41. The fuel injector 40 is a hydrocarbon supply that is used to introduce an unburned hydrocarbon 42 into the exhaust gas 15. A mixer or turbulator 44 may also be disposed within the exhaust conduit 14, in close proximity to the hydrocarbon injector 40, to further assist in thorough mixing of the hydrocarbon 42 with the exhaust gas 15 to create an exhaust gas and hydrocarbon mixture. It is contemplated that, in some circumstances the hydrocarbon injector 40 may be omitted, and the engine 12 may be used as the hydrocarbon supply instead of the hydrocarbon injector 40. Specifically, operating parameters of the engine 12 such as, for example, fuel injection timing and quantity, may be adjusted for providing hydrocarbon to the exhaust gas stream 15.

A control module 50 controls the engine 12 and one or more components of the exhaust treatment system 12 based on sensed and/or modeled data. For example, an upstream $NO_x$ sensor 60 and a downstream $NO_x$ sensor 62 detect a level of $NO_x$ in the exhaust gas 15 at various locations in the exhaust gas treatment system 10. The upstream $NO_x$ sensor 60 measures a level of $NO_x$ in the exhaust gas 15 at a location upstream of the SCR device 20 and generates a sensor signal based thereon. The downstream $NO_x$ sensor 62 measures a level of $NO_x$ in the exhaust gas 15 at a location downstream of the SCR device 20 and generates a sensor signal based thereon. The control module 50 is also in communication with a temperature sensor 63 located upstream of the SCR device 20 and a temperature sensor 64 located downstream of the SCR device 20. The control module 50 monitors the temperature sensors 63 and 64 to determine an average temperature of the SCR device 20. The control module 50 is also in communication with the injector 32 as well as the hydrocarbon injector 40.

Figure 2:
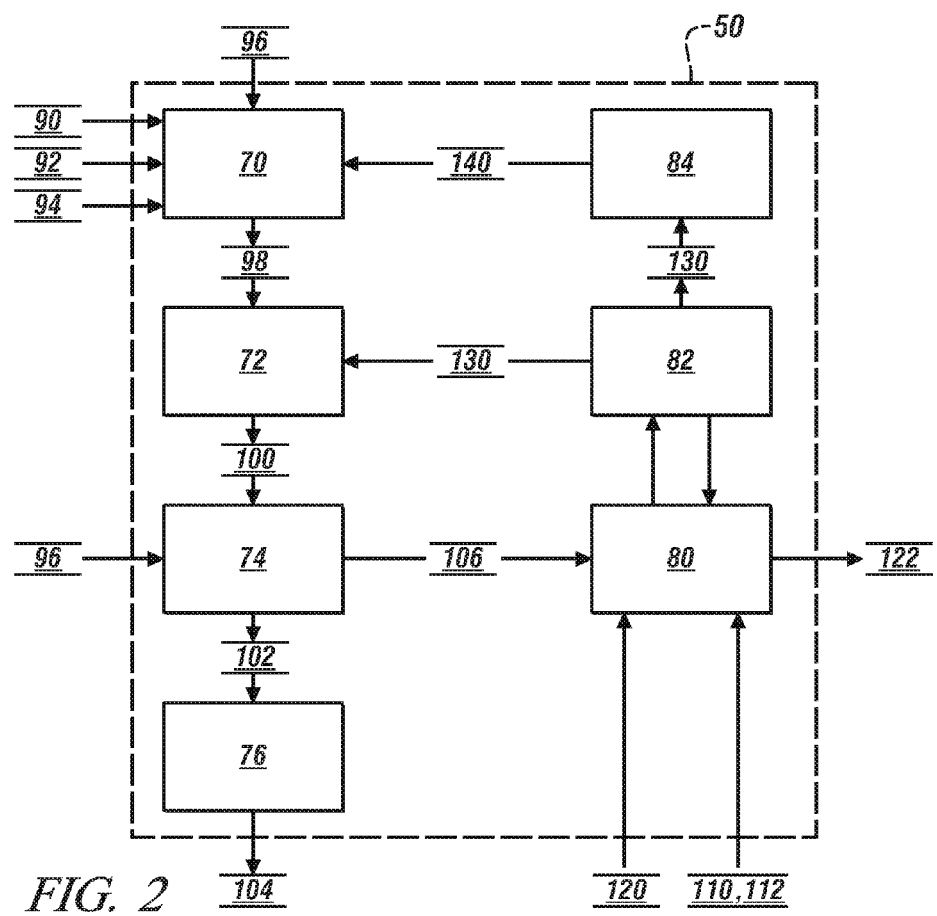
FIG. 2 is a dataflow diagram illustrating a control module of the exhaust treatment system in accordance with exemplary embodiments.

Referring now to FIG. 2, a dataflow diagram illustrates various embodiments of an SCR monitoring system that may be embedded within the control module 50. Various embodiments of SCR monitoring systems according to the present disclosure may include any number of sub-modules embedded within the control module 50. As can be appreciated, the sub-modules shown in FIG. 2 may be combined and/or further partitioned to selectively activate the hydrocarbon supply 41 (the hydrocarbon injector 40 or the engine 12 shown in FIG. 1) and determine the efficiency of the SCR device 20 (FIG. 1). Inputs to the control module 50 may be sensed from the engine 12 (FIG. 1), received from other control modules (not shown), and/or determined/modeled by other sub-modules (not shown) within the control module 50. In various embodiments, the control module 50 includes an activation module 70, a hydrocarbon activation module 72, an SCR temperature timer module 74, a diagnostic module 76, an SCR efficiency calculation module 80, an SCR efficiency timer 82, and a deactivation module 84.

The activation module 70 determines if the hydrocarbon supply (the hydrocarbon injector 40 or the engine 12 shown in FIG. 1) should be activated to heat the SCR device 20 (FIG. 1). The activation module 70 receives as inputs a plurality of operating conditions related to determining the efficiency of the SCR device 20. Any suitable operating conditions related to determining the efficiency of the SCR device 20 may be used. For example, in one embodiment, the operating conditions include a vehicle speed 90, an exhaust gas flow 92 of the exhaust gas 15 located within the exhaust gas conduit 14 (FIG. 1), and an accelerator pedal position 94 (the accelerator pedal is not shown in FIG. 1). The activation module 70 also receives as input an SCR average temperature 96 (i.e., as determined from the temperatures measured by the temperature sensors 63 and 64 shown in FIG. 1). The activation module 70 determines if the SCR average temperature 96 is within the operating temperature range. The activation module 70 also determines if the values of each of the operating conditions (e.g., the vehicle speed 90, the exhaust gas flow 92 and the accelerator pedal position 94) are within a respective predetermined range (e.g., the vehicle speed 90 is within a vehicle speed range, the exhaust gas flow 92 is within an exhaust gas flow range, and the accelerator pedal position 90 is within a pedal position range). It should be noted that if the values of each the operating conditions are within their respective predetermined range, and if the value of the SCR average temperature 96 is within the operating temperature range, the results of the efficiency calculation of the SCR device 20 by the SCR efficiency calculation module 80 (which is discussed below) will generally be accurate, and may be used to accurately diagnose the SCR device 20 (FIG. 1).

The activation module 70 determines if the hydrocarbon supply (the hydrocarbon injector 40 or the engine 12 shown in FIG. 1) needs to be activated in order to elevate the SCR average temperature 96 to accurately determine the efficiency of the SCR device 20. Specifically, if the operating conditions (e.g., the vehicle speed 90, the exhaust gas flow 92 and the accelerator pedal position 94) are each operating within the respective predetermined range, but if the SCR average temperature 96 is below the operating temperature range, this indicates the SCR device 20 needs to be heated. Specifically, the SCR average temperature 96 needs to first be elevated to the operating temperature range before the efficiency of the SCR device 20 may be accurately calculated. Thus, the activation module 70 sends an activation signal 98 to the hydrocarbon activation module 72. The activation signal 98 indicates the hydrocarbon supply (e.g., the hydrocarbon injector 40 or the engine 12 shown in FIG. 1) should be activated to heat the SCR device 20 (FIG. 1).

The hydrocarbon activation module 72 activates the hydrocarbon supply upon receipt of the activation signal 98. Upon activation, the hydrocarbon supply introduces hydrocarbons in the exhaust gas conduit 14 and elevates the temperature of the exhaust gas 15, thereby heating the SCR device 20 (FIG. 1). Referring now to FIGS. 1-2, in one embodiment the hydrocarbon supply may be the hydrocarbon injector 40 (e.g., the hydrocarbon injector 40 releases unburned hydrocarbon 42 into the exhaust gas 15). In another approach, the engine 12 may act as the hydrocarbon supply (e.g., operating parameters of the engine 12 such as, for example, fuel injection timing and quantity, may be adjusted for providing hydrocarbon to the exhaust gas 15). Once the hydrocarbon supply is activated, a heat request test is initiated.

During the heat request test, the SCR average temperature 96 is monitored for a predetermined amount of time to determine if the SCR device 20 is operating within the operating temperature range. Specifically, the hydrocarbon activation module 72 sends an activation signal 100 to the SCR temperature timer module 74 upon activating the hydrocarbon supply. Upon receipt of the activation signal 100 from the hydrocarbon activation module 72, the SCR temperature timer module 74 monitors the SCR average temperature 96 for a predetermined amount of time to determine if the SCR device 20 (shown in FIG. 1) is operating within the operating temperature range. In one exemplary embodiment, the predetermined amount of time may be about one minute, however, it is to be understood that other periods of time may be used as well.

In the event the SCR device 20 is not operating within the operating temperature range within the predetermined amount of time (e.g., the predetermined amount of time has expired and the SCR device 20 remains below the operating temperature range), the SCR temperature timer module 74 sends a timeout signal 102 to the diagnostic module 76. Upon receipt of the timeout signal 102, the diagnostic module 76 generates an error message or a diagnostic code 104. In one embodiment, the diagnostic code 104 is reported on a serial data bus of the vehicle (not shown). The diagnostic code 104 provides an indication that the hydrocarbon supply may not be functioning properly to sufficiently heat the SCR device 20 to attain the operating temperature range. In one exemplary approach, if the diagnostic code 104 is set, then hydrocarbon supply (e.g., the hydrocarbon injector 40 or the engine 12) may be deactivated such that hydrocarbon or fuel 42 may not be injected into the exhaust gas stream 15 to elevate the exhaust gas 15 temperature.

In the event the SCR device 20 is operating within the operating temperature range within the predetermined amount of time, a diagnostic of the SCR average temperature 96 is set to "passed" and the SCR temperature timer module 74 sends an activation signal 106 to the SCR efficiency calculation module 80. The activation signal 106 indicates that the SCR device 20 has been heated to the operating temperature range, and thus the efficiency of the SCR device 20 may be calculated. The SCR efficiency calculation module 80 receives as input an upstream $NO_x$ concentration value 110 (e.g., determined by the upstream $NO_x$ sensor 60 shown in FIG. 1) and a downstream $NO_x$ concentration value 112 (e.g., determined by the downstream $NO_x$ sensor 62 shown in FIG. 1). The SCR efficiency calculation module 80 also receives as input various enablement requirements 120 to determine the efficiency of the SCR device 20. Some examples of the enablement requirements 120 may include, but are not limited to, a delta temperature profile of the SCR device 20, and an exhaust gas mass flow rate during idle.

Based on the upstream $NO_x$ concentration value 110 and the downstream $NO_x$ concentration value 112, the SCR efficiency calculation module 80 determines an efficiency 122 of the SCR device 20 (FIG. 1). For example, in one embodiment the SCR efficiency calculation module 80 determines the efficiency 122 based on the following equation:

$$\text{Eff}=1-NO_x\_DWN/NO_x\_UP. \quad (1)$$

where Eff represents the efficiency 122, $NO_x\_DWN$ represents the measured concentration of $NO_x$ downstream (e.g., the downstream $NO_x$ concentration value 112). $NO_x\_UP$ represents the measured concentration of $NO_x$ upstream (e.g., the upstream $NO_x$ concentration value 112).

The SCR efficiency calculation module 80 is in communication with and is monitored by the SCR efficiency timer module 82. The SCR efficiency timer module 82 determines if the SCR efficiency calculation module 80 determines the efficiency 122 within a predetermined amount of time. In the event the SCR efficiency calculation module 80 is unable to calculate the efficiency 122 within the predetermined amount of time, then the SCR efficiency timer module 82 generates a deactivation signal 130. The deactivation signal 130 indicates there may be an issue unrelated to the SCR average temperature 96 or the operating conditions (e.g., the vehicle speed 90, the exhaust gas flow 92 and the accelerator pedal position 94) that prevents the SCR efficiency calculation module 80 from determining the efficiency 122. For example, the SCR efficiency calculation module 80 may be unable to determine the efficiency 122 depending on the status of one or more of the enablement requirements 120 (e.g., a delta temperature profile of the SCR device 20 may be above a threshold value).

The deactivation signal 130 is sent to the hydrocarbon activation module 72. Upon receipt of the deactivation signal 130, the hydrocarbon activation module 72 will deactivate the hydrocarbon supply (the hydrocarbon injector 40 or the engine 12 shown in FIG. 1), and hydrocarbons are no longer introduced into the exhaust gas conduit 14 (FIG. 1).

The deactivation signal 130 may also be sent to the deactivation module 84. The deactivation module 84 may keep track of a number of times that the deactivation signal 130 is sent during a drive cycle (i.e., also referred to as a number of unlocks). If the number of times the deactivation signal 130 is sent to the activation module 70 exceeds a threshold value (e.g., for example, three times during a drive cycle), then a termination signal 140 may be sent to the activation module 70. The termination signal 140 generally indicates that the SCR efficiency calculation module 80 is repeatedly unable to calculate the efficiency 122 during a drive cycle. Upon receipt of the termination signal 140, the activation module 70 is deactivated, and may no longer send the activation signal 98 to the hydrocarbon activation module 72. Thus, the hydrocarbon supply may no longer be activated. The hydrocarbon supply may no longer be activated because the SCR calculation module 80 has repeatedly been unable to determine the efficiency 122 (e.g., three times during a drive cycle), and thus there is no need to continuously elevate the temperature of the exhaust gas 15 (FIG. 1) in an attempt to determine the efficiency 122.

The exhaust gas treatment system 10 as described above provides an approach to accurately determine the efficiency 122 of the SCR device 20, even if SCR device 20 is operating below the operating temperature range. Specifically, the exhaust gas treatment system 10 heats the SCR device 20 via the hydrocarbon supply in the event the SCR device 20 is operating below the operating temperature range, thereby heating the SCR device 20 to the operating temperature range needed to accurately determine the efficiency 122. Some types of exhaust gas treatment systems that are currently available may be unable to accurately determine the efficiency of the SCR device depending on driving conditions. Specifically, the SCR device may operate below the operating temperature range needed to determine the efficiency of the SCR device unless the drive cycle is relatively transient; the vehicle is relatively heavily loaded with cargo, or during towing. In contrast, the exhaust gas treatment system 10 as disclosed provides an approach for elevating the temperature of the SCR device 20 to the operating temperature range by activating the hydrocarbon supply, regardless of driving conditions. Moreover, in the event the SCR device 20 is unable to reach the operating temperature range while the hydrocarbon supply is activated, the diagnostic code 104 may be generated to provide an indication that the hydrocarbon supply may not be functioning properly.

Figure 3:
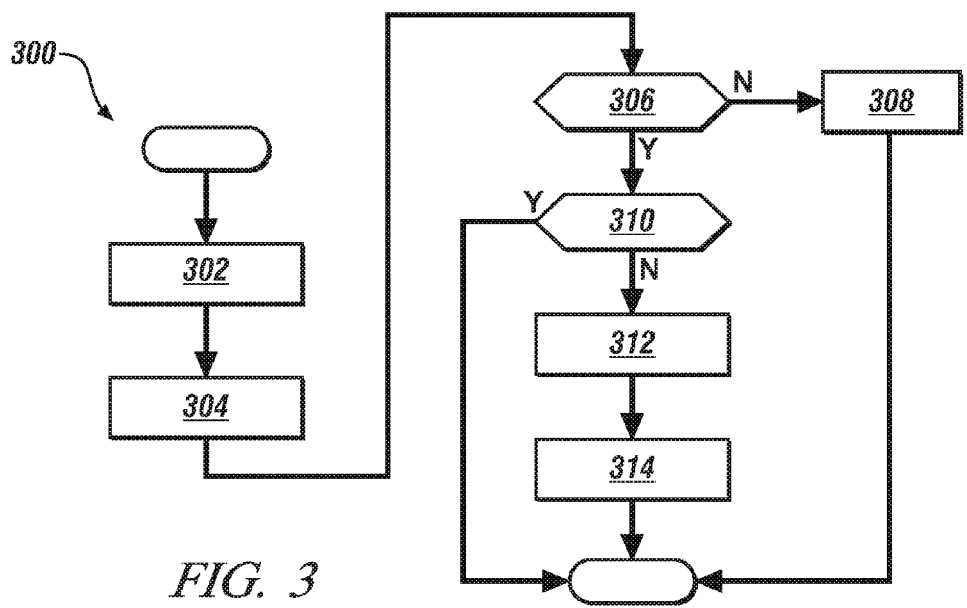
FIG. 3 is a flowchart illustrating a control method that can be performed by the exhaust treatment system in accordance with exemplary embodiments.

A method of selectively activating the hydrocarbon supply and determining the efficiency 122 of the SCR device 20 will now be explained. Referring to FIG. 3, an exemplary process flow diagram illustrating an exemplary process of operating the exhaust gas treatment system 10 is generally indicated by reference number 300. Referring generally to FIGS. 1-3, process 300 begins at step 302, where the activation module 70 determines if the operating conditions (e.g., the vehicle speed 90, the exhaust gas flow 92 and the accelerator pedal position 94) are each operating within the respective predetermined range. The activation module 70 also determines if the SCR average temperature 96 is below the operating temperature range. If the operating conditions are each within the respective predetermined range, and if the SCR average temperature 96 is below the threshold range, this indicates the SCR device 20 needs to be heated before the efficiency 122 of the SCR device 20 may be determined. Thus, the activation module 70 sends the activation signal 98 to the hydrocarbon activation module 72. Method 300 may then proceed to step 304.

In step 304, upon receipt of the activation signal 98, the hydrocarbon activation module 72 activates the hydrocarbon supply (e.g., either the hydrocarbon injector 40 or the engine 12). The introduction of hydrocarbon in the exhaust gas conduit 14 elevates the temperature of the exhaust gas 15 to heat the SCR device 20. The hydrocarbon activation module 72 sends the activation signal 100 to the SCR temperature timer module 74 upon activating the hydrocarbon supply. Method 300 may then proceed to step 306.

In step 306, upon receipt of the activation signal 100, the SCR temperature timer module 74 monitors the SCR average temperature 96 for the predetermined amount of time to determine if the SCR device 20 is operating within the operating temperature range. If the SCR device 20 is not operating within the operating temperature range within the predetermined amount of time (e.g., the predetermined amount of time has expired), then method 300 may proceed to step 308. However, if the SCR device 20 operates within the operating temperature range within the predetermined amount of time, the diagnostic of the SCR average temperature 96 is set to "passed," and the SCR temperature timer module 74 sends an activation signal 106 to the SCR efficiency calculation module 80. Method 300 may then proceed to step 310.

In step 308, the SCR temperature timer module 74 sends the timeout signal 102 to the diagnostic module 76. Upon receipt of the timeout signal 102, the diagnostic module 76 generates the diagnostic code 104. The diagnostic code 104 provides an indication that the hydrocarbon supply may not be functioning properly to sufficiently heat the SCR device 20 to attain the operating temperature range. Method 300 may then terminate.

In step 310, the SCR efficiency calculation module 80 is monitored by the SCR efficiency timer module 82. The SCR efficiency timer module 82 determines if the SCR efficiency calculation module 80 is able to determine the efficiency 122 of the SCR device 20 within a predetermined amount of time. In the event the efficiency 122 is calculated within the predetermined amount of time, method 300 may then terminate.

In the event the SCR efficiency calculation module 80 is unable to calculate the efficiency 122 within the predetermined amount of time, method 300 may proceed to step 312. In step 312, the SCR efficiency timer module 82 generates the deactivation signal 130. Method 300 may then proceed to step 314.

In step 314, the deactivation signal 130 is sent to the hydrocarbon activation module 72 and the deactivation module 84. Upon receipt of the deactivation signal 130, the hydrocarbon activation module 72 will deactivate the hydrocarbon supply (the hydrocarbon injector 40 or the engine 12 shown in FIG. 1). The deactivation module 84 may keep track of the number of times that the deactivation signal 130 has been sent during a drive cycle. If the number of times the deactivation signal 130 is sent to the activation module 70 exceeds a threshold value (e.g., three times during a drive cycle), the activation module 70 is deactivated, and may no longer send the activation signal 98 to the hydrocarbon activation module 72. Method 300 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:
1. A control method for monitoring a selective catalytic reduction ("SCR") device of an exhaust gas treatment system included in a vehicle, the control method comprising:
  monitoring a plurality of operating conditions existing during a current driving condition controlled by an engine of the vehicle, and an SCR temperature by an electronic control module including a hardware processor with electronic circuitry configured to execute operative circuit logic, the plurality of operating conditions related to determining an efficiency of the SCR device;
  determining if each of the operating conditions are operating within a respective predetermined range, and if the SCR temperature is below an operating temperature range;
  activating a hydrocarbon supply including an injector configured to inject unburned hydrocarbon based on each of the plurality of operating conditions operating within the respective predetermined range regardless of the current driving condition controlled by the engine, and the SCR temperature being below the operating temperature range, the hydrocarbon supply located upstream of the SCR device to generate heat if activated;

monitoring the SCR temperature to determine if the SCR device is operating within the operating temperature range after the hydrocarbon supply is activated; and when the SCR temperature is below the operating temperature range within a predetermined amount of time, setting a diagnostic code and disabling the hydrocarbon supply.

2. The control method of claim 1, further comprising selectively determining the efficiency of the SCR device within a predetermined amount of time if the SCR device is operating within the operating temperature range.

3. The control method of claim 1, further comprising deactivating the hydrocarbon supply if the efficiency of the SCR device is not determined within a predetermined amount of time, and wherein the SCR device is operating within the operating temperature range.

4. The control method of claim 1, wherein the efficiency of the SCR device is based on an upstream $NO_x$ concentration value and a downstream $NO_x$ concentration value.

5. The control method in claim 4, wherein the efficiency is calculated using the following equation:

$$Eff = 1 - NO_{x\_}DWN/NO_{x\_}UP$$

wherein Eff is the efficiency, $NO_{x\_}DWN$ is a measured concentration of the downstream $NO_x$ concentration value, and $NO_{x\_}UP$ is a measured concentration of the upstream $NO_x$ concentration value.

6. The control method of claim 1, wherein the plurality of operating conditions include a vehicle speed, an exhaust flow rate, and a pedal position.

7. The control method of claim 1, wherein the operating temperature range is above a light-off temperature of the SCR device.

8. The control method of claim 1, wherein the hydrocarbon supply comprises one of a hydrocarbon injector and an internal combustion engine.

9. A control system for monitoring a selective catalytic reduction ("SCR") device of an exhaust gas treatment system in a vehicle, the control system comprising:

a hydrocarbon supply located upstream of the SCR device, the hydrocarbon supply including an injector configured to be selectively activated to inject unburned hydrocarbons for generating heat to the SCR device; and an electronic control module including a hardware process having electronic circuitry configured to execute operative logic, the electronic control module in communication with the hydrocarbon supply, the electronic control module comprising:

an activation module comprising a hardware processor including operative logic that, when executing computer-readable instructions, performs monitoring a plurality of operating conditions existing during a current driving condition controlled by an engine of the vehicle and an SCR temperature, the activation module determining if each the plurality of operating conditions are within a respective predetermined range and the SCR temperature is below an operating temperature range, the plurality of operating conditions related to determining an efficiency of the SCR device;

a hydrocarbon activation module comprising a hardware processor including operative logic that, when executing computer-readable instructions, is configured to activate the hydrocarbon supply if each of the plurality of operating conditions are operating within the respective predetermined range regardless of the current driving condition controlled by an engine of the vehicle, and if the SCR temperature is below the operating temperature range; and an SCR temperature timer module comprising a hardware processor including operative circuit logic that, when executing computer-readable instructions, is configured to monitor the SCR temperature to determine if the SCR device is operating within the operating temperature range after the hydrocarbon supply is activated, wherein when the SCR temperature is below the operating temperature range within a predetermined amount of time, setting a diagnostic code and disabling the hydrocarbon supply.

10. The control system of claim 9, wherein the electronic control module includes an SCR efficiency calculation module that selectively determines the efficiency of the SCR device within a predetermined amount of time if the SCR device is operating within the operating temperature range.

11. The control system of claim 9, wherein the electronic control module includes an SCR efficiency calculation module that deactivates the hydrocarbon supply if the efficiency of the SCR device is not determined within a predetermined amount of time, and wherein the SCR device is operating within operating temperature range.

12. The control system of claim 9, wherein the efficiency is based on an upstream $NO_x$ concentration value and a downstream $NO_x$ concentration value.

13. The control system of claim 12, wherein the efficiency is calculated using the following equation:

$$Eff = 1 - NO_{x\_}DWN/NO_{x\_}UP$$

wherein Eff is the efficiency, $NO_{x\_}DWN$ is a measured concentration of the downstream $NO_x$ concentration value, and $NO_{x\_}UP$ is a measured concentration of the upstream $NO_x$ concentration value.

14. The control system of claim 9, wherein the plurality of operating conditions include at least a vehicle speed, an exhaust flow rate, and a pedal position.

15. The control system of claim 9, wherein the operating temperature range is above a light-off temperature of the SCR device.

16. The control system of claim 9, wherein the hydrocarbon supply comprises one of a hydrocarbon injector and an internal combustion engine.

* * * * *